United States Patent [19]

Ishinaga

[11] Patent Number: 4,918,970
[45] Date of Patent: Apr. 24, 1990

[54] FULLY ENCLOSED DIE FORGING APPARATUS

[75] Inventor: Nobuyuki Ishinaga, Sagamihara, Japan

[73] Assignee: Aida Engineering, Ltd., Kanagawa, Japan

[21] Appl. No.: 214,283

[22] Filed: Jul. 1, 1988

[30] Foreign Application Priority Data

Jun. 7, 1987 [JP] Japan .................................. 62-168317
Apr. 28, 1988 [JP] Japan .................................. 63-105811

[51] Int. Cl.$^5$ ............................................. B21J 13/02
[52] U.S. Cl. ........................................ 72/354; 72/407
[58] Field of Search .................. 72/354, 407, 432, 452

[56] References Cited

U.S. PATENT DOCUMENTS 1,979,931 11/1934 Beche ..................................... 72/407
4,653,310 3/1987 Urata et al. ........................... 72/354

Primary Examiner—Lowell A. Larson
Attorney, Agent, or Firm—Kalish & Gilster

[57] ABSTRACT

According to the present invention, there is provided a fully enclosed die forging apparatus having an upside die and an underside die disposed oppositely in a vertical direction between a slide and a bolster. There is an upside cylinder mechanism contained in the slide which urges the upside die downward. There is an underside cylinder mechanism contained in the bolster which urges the underside die upward. An upside punch is inserted in the upside die and moves synchronously with the movement of the slide. An underside punch is inserted into the underside die and is supported by the bolster. There is a cam mechanism that causes both punches to rush into the dies, respectively, by moving the upside die and underside die toward the underside punch at a speed slower than the moving speed of the slide. The cam mechanism has a push pin, and a cylinder with an abutting piston that prevents damage to the cam mechanism by reducing pressure that may be exerted on the cams.

9 Claims, 10 Drawing Sheets

FULLY ENCLOSED DIE FORGING APPARATUS

BACKGROUND OF THE INVENTION:

1. Field of the Invention

The present invention relates to a fully enclosed die forging apparatus and more particularly a fully enclosed die forging apparatus provided with a die moving mechanism which has both punches operated to rush into dies, respectively, by moving a die maintained with contact following the movement of a slide toward a punch on a fixed side at a speed slower than the moving speed of the slide.

2. Description of the Prior Art:

Fully enclosed die forging in which raw material is molded in a cavity obtained by having a pair of dies contact with each other is being widely used recently for molding various products because yield of the raw material is high, and moreover, products having complex shapes may be manufactured with high accuracy.

Conventionally, fully enclosed die forging of molded articles 11 represented by a spider of a triport type equal velocity joint for automobiles and so forth having shapes as shown in FIG. 10 and FIG. 11 is performed in such a manner that a cylindrical slug 13 as shown in FIG. 12 is inserted in cavities 19 and 21 formed with an upper die 15 and a lower die 1 as shown in left part of FIG. 13, and upper and lower punches 23 and 25 are made close to each other as shown in the right part of FIG. 13.

Thereupon, when the shape of an aimed forged article 11 is of face symmetric with reference to a cross-section 27 having the maximum area as the forged article 11 described above, it is required to operate upper and lower punches 23 and 25 keeping face symmetry with reference to a cross-section 31 of the maximum area of a cavity 29 while maintaining such a state that above-mentioned upper die 14 and lower die 7 are made to contact with each other and enclosing force is applied.

Because of such reason, a fully enclosed die forging apparatus as shown in FIG. 14 has been used conventionally. For such a fully enclosed die forging apparatus, a hydraulic or mechanical double action press is illustrated, and the left half of the drawing shows the state before forging and the right half of the drawing shows the state after molding, respectively.

In the drawing, reference numeral 11 denotes a forged article, 13 denotes a slug, 15 denotes an upper die, 17 denotes a lower die, 23 denotes an upper punch, 25 denotes a bolster, 35 denotes a bed, 36 denotes an upper pressure pin and 37 denotes a lower pressure pin.

In this full enclosed die forging apparatus, first, the slug 13 is charged by hand or by feeding device into a cavity 38 of the lower die 17. Next, when the slide 33 of the press descends, the upper and lower dies 15 and 17 come into contact with each other. In a hydraulic press, the slide 33 is urged downward by means of a hydraulic device, and in a mechanical press, the slide 33 stops at the bottom dead center, thereby to apply enclosing force to the upper and lower dies 15 and 17.

In succession, in a hydraulic press, a hydraulic unit which is of a different system from the unit for driving the slide 33 installed on the side of the slide 33 and on the side of the bed 35 is operated. In case of a mechanical press, a driving unit installed separately from the unit for driving the slide 33 is operated in the same manner as in the case of the hydraulic press. With this, the upper and lower pressure pins 36 and 37 are operated, the upper and lower punches 23 and 25 are moved toward above-mentioned cross-section 31, and the slug 13 is pushed out for working toward the cavity 29 formed by the upper and lower dies 15 and 17.

Then, after forging, the slide 33 is ascended and the upper and lower dies 15 and 17 are separated. During ascending or at the upper limit thereof, the upper and lower punches 23 and 25 are operated by the hydraulic unit, and the forged article 11 is discharged out of the die.

However, it is required to employ a double action press in order to apply such a fully enclosed die forging apparatus to a hydraulic press. Accordingly, a special purpose machine is required for the forged article 11, which spoils universality. Also, in case of temperature change of pressure oil for operating the upper and lower punches 23 and 25, mixing of bubbles into the pressure oil and so forth are generated, the speed of the upper and lower punches 23 and 25 is changed, which makes it impossible to secure the product accuracy of the forged article 11. In order to avoid this, it has been required to add a correction mechanism which always performs flow control properly.

Besides, in case of application to a mechanical press, a special purpose machine in which a drive unit for driving the upper punch 36 is provided on the side of the slide 33 and a pressure drive unit is also required to be provided on the side of the bed 35 is required. Moreover, because the upper and lower dies 15 and 17 are fitted together at the bottom dead point, enclosing force becomes unstable. Therefore, more enforcing force than required is applied to the press and the upper and lower dies 15 and 17, which makes the life of the metal mold shorter.

The subject applicant has previously applied for patent on a fully enclosed die forging apparatus which is laid open under Provisional Publication No. 133927/84 as a fully enclosed die forging apparatus which is capable of solving such problems.

FIG. 15 shows a fully enclosed die forging apparatus disclosed in said Publication The left half of the Figure shows a state when full enclosing is commenced, and the right half thereof shows the state when forging is completed at the bottom dead point.

In the Figure, an upside die set plate 61 is fixed to a slide 60 of the press, and an insert plate 62 is inserted into this upside die set plate 61 with positioning by a knockout pin 63.

In slide 60, a cushion pin 65 is urged downward by installing a cushion rod 64 which is urged downward by pressure liquid so as to ascend and descend freely. Similarly, a knockout rod 66 is provided in slide 60 so as to ascend and descend freely.

An upside die holder 67 is fixed to the upside die set plate 61, a cam holder 68 is fixed to die holder 67, and furthermore, a first cam 69 is fixed to the cam holder 68. Besides, first cam 69 drives the lower die through a second, a third and a fourth cams which will be described later.

An upper die 70 is fitted to the inside of the upside die holder 67 so as to ascend and descend freely. A punch block 71 and an upper punch 72 are fitted to the inside of this upper die 70 so as to ascend and descend freely.

On the other hand, an underside die set plate 74 is fixed to a bolster 73, and an insert plate 75 is inserted into this die set plate 74. Further, in bolster 73, a knockout rod 76 is provided so as to push up a knockout pin 77 at a constant timing by receiving a pushing-up force by pressure liquid or a mechanical device. In a similar manner, in bolster 73, a cushion pin 79 in the insert plate 75 upward.

To the underside die set plate 74, an underside die holder 80; is positioned and fixed with a knockout pin 81, and a plate 83 is positioned and inserted into this die holder 80 through a knockout pin 82. Further, in underside die holder 80, pads 84 and 85 are built in, and a spring 86 is installed under compressed condition between these pads 84 and 85.

Additionally, this spring 86 urges a lower die, which is described later, upward through a pressure pin 87 penetrating the plate 83 and said pad 84. Inside spring 86, a cushion ring 88 is disposed so as to ascend and descend freely, and the urging force of the cushion pin 79 is arranged so as to be conveyed to a lower die 90 from a pressure pin 89 through this cushion ring 88.

It is also arranged that, at the center of the upper surface of said insert plate 75, a die anvil 92 is provided that penetrates punch block 91 so as to ascend and descend freely, and a lower punch 93 is pushed up with a predetermined timing receiving pushing-up action of a knockout pin 77 by attaching a lower punch 93 on the upper part of the punch block 91.

On the other hand, a guide 95 for guiding a second cam 94, etc. is fixed to said underside die holder 80. This second cam 94 is held by fitting slidably at a bore portion of the guide 95 having a circular form, and the bore portion of this cam 94 is fitted to the lower die 90. A step portion 94a of the cam 94 is engaged with the step portion of the lower die 90, and then cam 94 is held by fitting slidably in a vertical direction only in a guide groove 96 along the center of the die 90.

Further, third and fourth cams 97 and 98 which are held slidably in a circumferential direction only by the lower die 90 and the guide 95 are provided between first cam 69 and second cam 94. Thus, when first cam 69 descends, second cam 94 moves downward through third and fourth cams 97 and 98.

FIG. 16 thru FIG. 18 are drawings showing the locations and operating condition of these cams. As seen from these drawings, two pieces of the first cams 69 are provided at diagonal locations of the cam holder 68 and formed in a cleat shape contracting downward, and the inclined faces of these first cams 69 are made to face between end inclined faces of adjacent third and fourth cams 97 and 98 from the upper part.

Also, the second cam 94 is provided at a location the phase of which is shifted from the first cam 69 by 90° and formed in a cleat shape expanding downward, and by having the inclined surface face between point inclined faces of third and fourth cams 97 and 98 from the lower part, third and fourth cams 97 and 98 are moved in a circumferential direction thereby to push the second cam downward when the first cam 69 descends. Also, the base ends of third and fourth cams 97 and 98 are formed into inclined faces going upward and the point ends are formed into inclined faces going downward.

In a fully enclosed die forging apparatus thus constructed, the slug inserted into the cavity of the lower die 90 is formed under a condition that upper and lower dies 70 and 90 are fully enclosed, and is taken out by the operation of the knockout pin 77, etc.

Thereupon, in this fully enclosed die forging apparatus, at the same time as upper and lower dies come into contact with each other, third and fourth cams 97 and 98 and the first cam 69 contact with each other as shown in FIG. 17. Therefore, when the slide 60 descends and the first cam 69 also descends, adjacent third cam 97 and fourth cam 98 are moved in a horizontal direction, and the second cam 94 which is put between both cams 97 and 98 is pushed downward As the result, the die 90 which is engaged with the second cam 94 descends.

The descending speed of this die 90 is made slower than the descending speed of the punch 72 by setting the angle of each cam face at a predetermined angle, and upper and lower punches 72 and 93 move relatively to upper and lower dies 70 and 90.

In short, despite that upper and lower dies 70 and 90 descend at a lower speed than the descending speed of the upper punch 72, the lower punch 93 does not move. Accordingly, when the slide 60 is made to descend, upper and lower punches 72 and 93 rush into upper and lower dies 70 and 90, respectively, and move closely, thereby to perform expected forging.

In such a conventional fully enclosed die forging apparatus, however, cam 69 of the cam mechanism, which moves upper and lower dies 70 and 90 maintains contact toward the lower punch 93 on the fixed side at a speed lower than the moving speed of the slide 60 and performs rushing operation of upper and lower punches 72 and 93 into upper and lower dies 70 and 90, respectively, is mounted directly on the cam holder 68. Therefore, there is a fear that the cam mechanism is damaged when an abnormal force is applied to the cam mechanism.

SUMMARY OF THE INVENTION

It is an object of the present invention which has been made to solve above-mentioned problems to provide a fully enclosed die forging apparatus which is capable of surely preventing a large force from working on the cam mechanism.

It is a further object of the present invention to provide a fully enclosed die forging apparatus wherein damage to a cam mechanism is prevented.

It is a still further object of the present invention to provide a fully enclosed die forging apparatus having a position control mechanism for adjusting a plurality of cylinders so that the shape of a molded article may be adjusted.

It is a further object of the present invention to provide a fully enclosed die forging apparatus having a simplified cam mechanism.

DESCRIPTION OF THE PREFERRED EMBODIMENT OF THE INVENTION

A fully enclosed die forging apparatus according to this invention is an apparatus provided with an upside die and an underside die disposed opposedly in a vertical direction between a slide and a bolster, an upside cylinder mechanism which is disposed on an upside die set plate disposed on said slide or at a lower end of this slide and urges said upside die downward, an underside cylinder mechanism which is disposed on an underside die set plate disposed on said bolster or at an upper end of this bolster and urges said underside die upward, an upside punch which is inserted in said upside die and moves synchronously with the movement of said slide, an underside punch which is inserted into said underside die and supported by said bolster, and a cam mechanism having both punches operated to rush i.e., accelerate into dies, respectively, by moving said upside die and underside die toward the underside punch at a speed slower than the moving speed of said slide, wherein said cam mechanism is constructed so that said mechanism is operated by a lower end of a push pin which is moved downward synchronously with the movement of said slide; and the upper end of said push pin is made to abut directly or indirectly against a cylinder piston which moves synchronously with the movement of said slide.

Furthermore, a fully enclosed die forging apparatus according to this invention is arranged so that a plurality of cylinders moving synchronously with the movement of the slide are provided, and position of upper end faces thereof may be adjusted at the same time by means of a position control mechanism.

In the fully enclosed die forging apparatus according to this invention, the cam mechanism is constructed so as to be operated by the lower end of a push pin which is moved downward synchronously with the movement of the slide, and at the same time, the upper end of the push pin is made to abut against the piston of the cylinder moving synchronously with the movement of the slide directly or indirectly. Accordingly, when a great force is applied to the cam mechanism by the movement of the slide, the piston moves against the pressure of the pressure liquid in the cylinder, and thus no great force is applied to the cam mechanism.

Also, in a fully enclosed die forging apparatus according to this invention, the positions of upper ends of a plurality of cylinders are adjusted at the same time by operating the position control mechanism.

The details of the present invention will be described hereinafter referring to embodiments shown in accompanying drawings.

Figure 1:
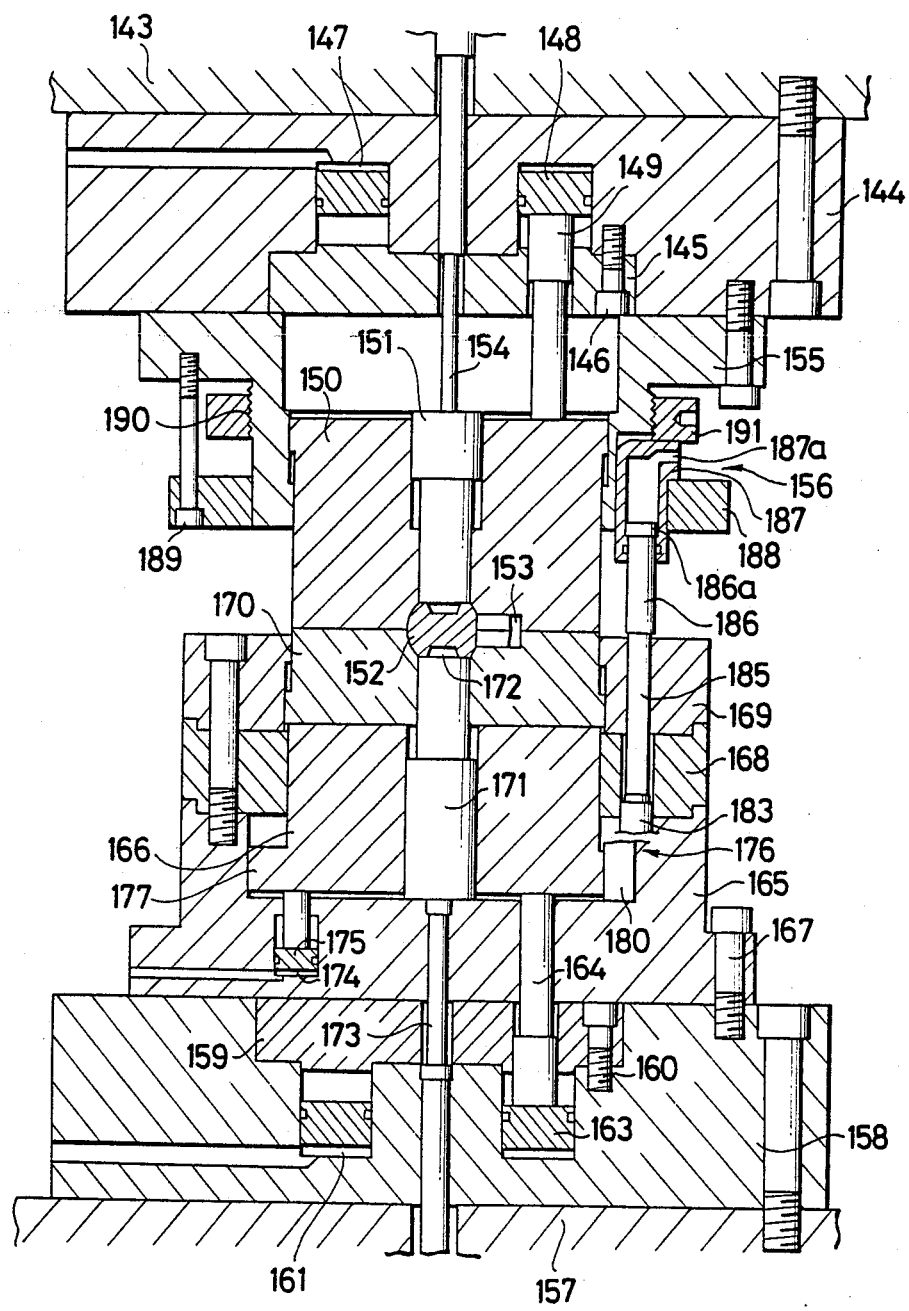
FIG. 1 is a longitudinal cross-sectional view showing an embodiment of a fully enclosed die forgig apparatus according to the present invention.

FIG. 1 shows an embodiment of a fully enclosed die forging apparatus according to the present invention. In this fully enclosed die forging apparatus, an upside die set plate 144 is fixed to a slide 143 of a press. An upside insert plate 145 is fixed with a bolt 146 to upside die set plate 144.

An upside cylinder 147 is formed on the upside die set plate 144, and an upside piston 148 is inserted into upside cylinder 147. An upside actuating pin 149 is disposed on the underside of upside piston 148, and the lower end of upside actuating pin 149 abuts against an upper face of an upside die 150.

An upside punch 151 is inserted at the central portion of upside die 150, and a cavity 153 corresponding to the shape of an article 152 to be forged is formed at the lower part of upside die 150. Penetrating through central portions of upside die set plate 144 and upside insert plate 145, is disposed a knockout pin 154 so as to ascend and descend freely.

An upside die holder 155 is fixed to upside die set plate 144, and a cam mechanism operating portion 156 for operating a cam mechanism which will be described later is disposed on an outer circumference of upside die holder 155.

On the other hand, an underside die set plate 158 is fixed to the bolster 157 of the press. An underside insert plate 159 is fixed with a bolt 160 to underside die set plate 158. An underside cylinder 161 is formed in underside die set plate 158, and an underside piston 163 is inserted into underside cylinder 161.

An underside actuating pin 164 is disposed on the upper face of underside piston 163, and the upper end of underside actuating pin 164 abuts against a lower face of an underside pad 166 contained in an underside die holder 165 penetrating through the underside die holder 165. The underside die holder 165 is fixed to the underside die set plate 158 with a bolt 167, and underside holder 168 and underside guide 169 are disposed in succession on the upper part of underside die holder 165. An underside die 170 is inserted into underside guide 169. An underside punch 171 is inserted into the central portions of underside die 170 and underside pad 166, and a cavity 172 corresponding to the shape of the article 152 to be molded is formed in the upper part of underside die 170.

Penetrating through the central portions of underside die set plate 158, underside insert plate 159 and underside die holder 165, is disposed a knockout pin 173 so as to ascend and descend freely.

An auxiliary cylinder 174 is disposed in the underside holder 165, and an auxiliary piston 175 the upper end of which is abutted with the underside pad 166 through a pin is contained in auxiliary cylinder 174.

Further, in this embodiment, a cam mechanism 176 is disposed in the underside pad 166 for moving this underside pad. This cam mechanism 176 is operated in such a manner that upperside die 150 and underside die 170 that are maintained with contact are moved toward an underside punch 171 on the fixed side pursuant to the movement of slide 143 at a speed lower than the moving speed of slide 143 thereby to have upper and lower punches 151 and 171 rush into upper and lower dies 150 and 170, respectively.

Figure 2:
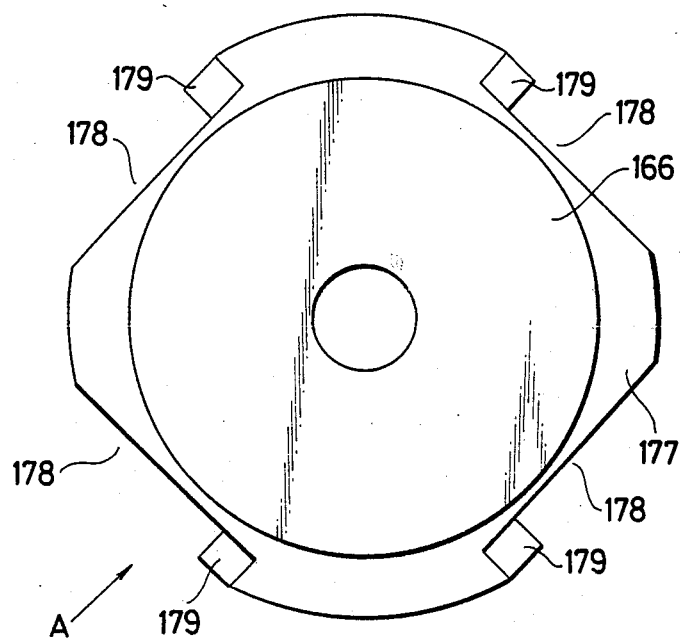
FIG. 2 is a top view of the underside pad show in FIG. 1.
Figure 3:
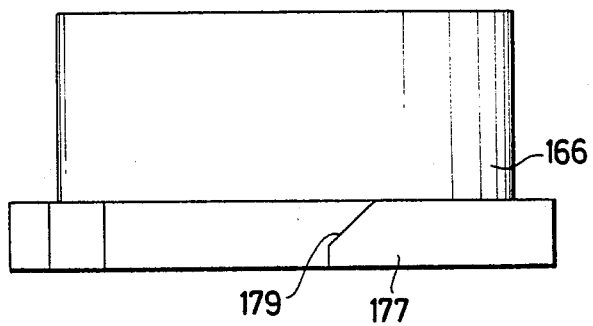
FIG. 3 is a view looking along the arrow A of the underside pat shown in FIG. 2.

That is, a large diameter portion 177 is formed at the lower part of underside pad 166 as shown in FIG. 2 and FIG. 3. At this large diameter portion 177, cutout portions 178 are formed at four locations at angles of 90°, and cam faces 179 are formed on these cutout portions 178, respectively. Cam faces 181 of horizontal cams 180 in rectangular parallelopiped shape are made to abut against these cam faces 179 as shown in FIG. 4 and FIG. 5.

Also, cam faces 184 of vertical cams 183 in plate form are made to abut against cam faces 182 formed at another ends of horizontal cams 180. The lower ends of the push pins 185 of the cam mechanism operating portion 156 shown in FIG. 1 are made to abut against the upper faces of vertical cams 183.

Figure 4:
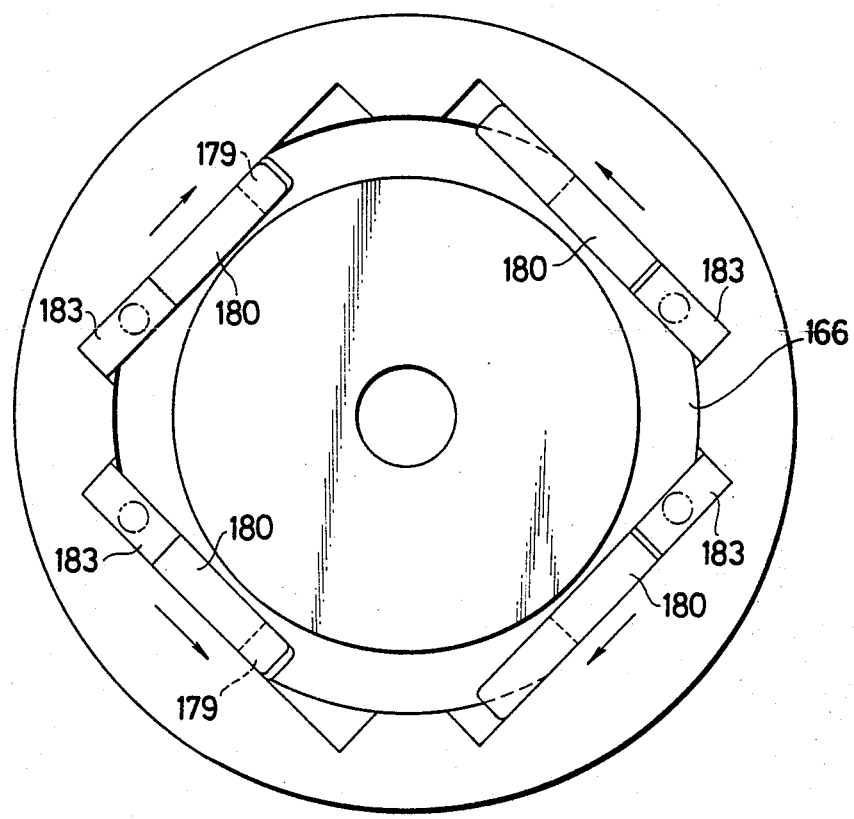
FIG. 4 is a top view showing a state in which a horizontal cam and a vertical cam are disposed on the underside pad.
Figure 5:
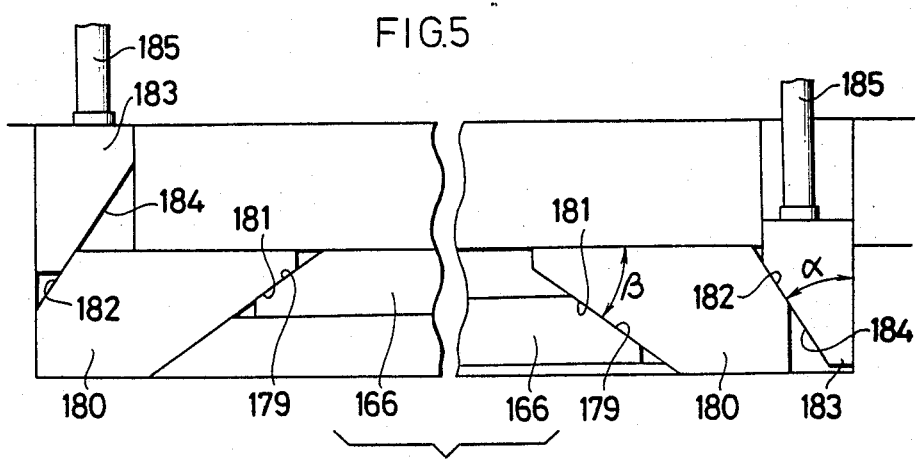
FIG. 5 is an explanatory view for explaining the operation of the cam mechanism shown in FIG. 4.

Besides, in FIG. 4 and FIG. 5, the left side of the Figure shows the state when vertical cam 183 is located at the upper limit position, and the right side thereof shows the state when vertical cam 183 is pushed by push pin 185 and located at the lower limit position. The cam mechanism operating portion 156 includes a pin 186 which abuts against the upper face of push pin 185 as shown in FIG. 1, and a piston part 186a formed at the upper part of pin 186 is inserted into the cylinder 187.

It is arranged that an oil at a certain pressure is supplied into cylinder 187 so that pin 186 may move upward when a great force is applied to it. The cylinder 187 is supported by a ring ferrule 188, and this ferrule 188 is fixed to the upside die holder 155 with a bolt 189.

Figure 6:
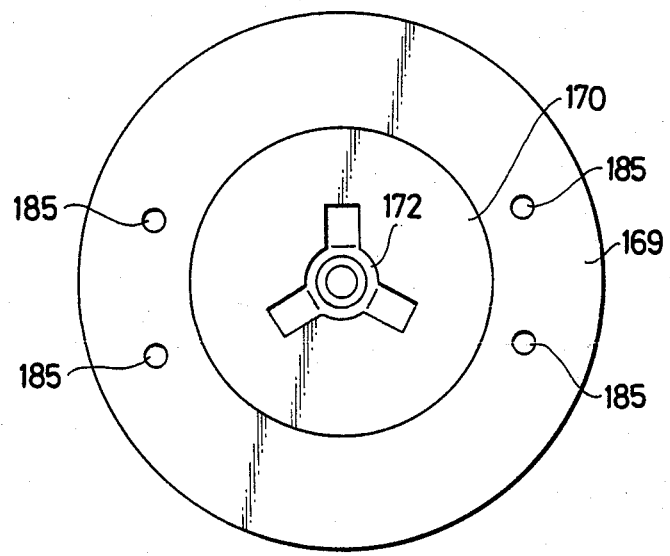
FIG. 6 is a top view showing an underside guide on which a push pin is disposed.
Figure 7:
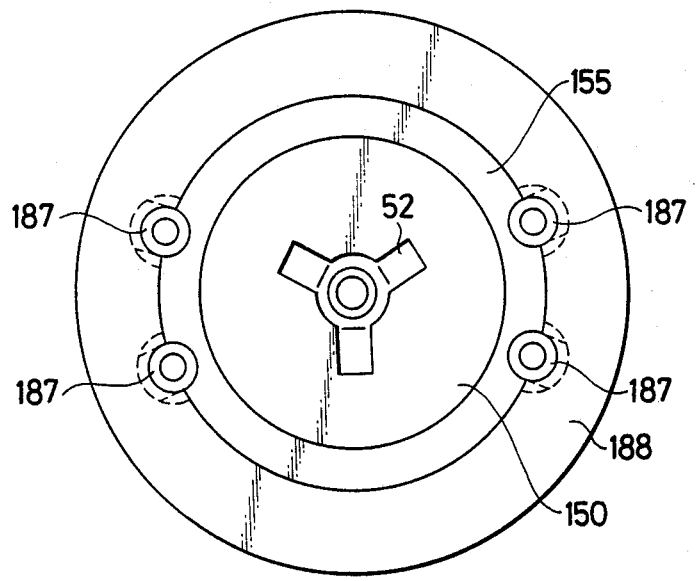
FIG. 7 is top view showing a ferrule disposed at the cylinder.

Further, a screw portion 190 is formed on the outer circumference of upside die holder 155, and a position control mechanism consisting of a nut 191 for determining simultaneously upper end positions of disposed plurality of cylinder 187 is screw-engaged with screw portion 190. Also, push pins 185 and cylinders 187 are disposed at four positions in a rectangular shape corresponding to the positions of vertical cams 183 as shown in FIG. 6 and FIG. 7.

Figure 8:
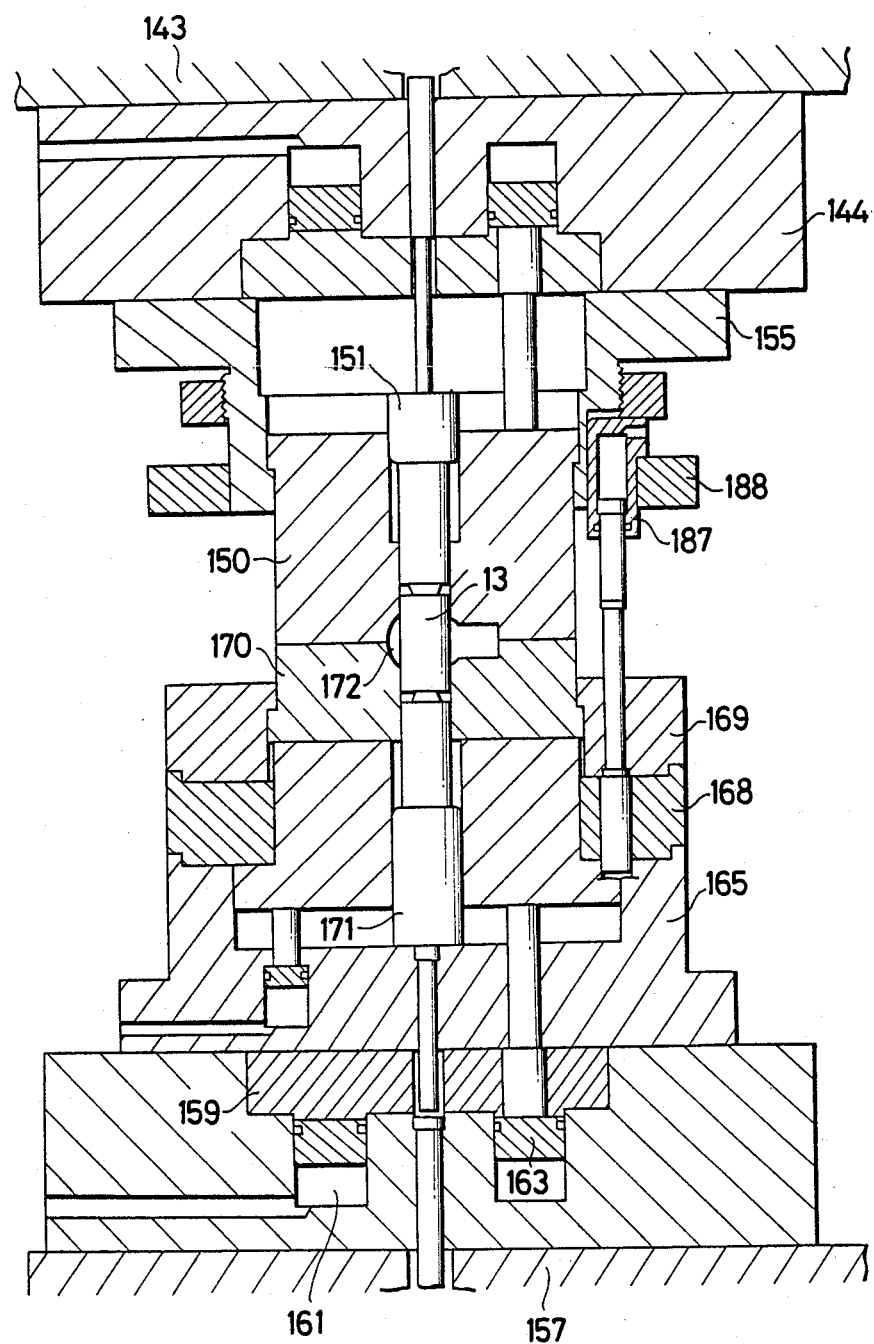
FIG. 8 is a longitudinal cross-sectional view showing the state which the slug is inserted into the fully enclosed die forging apparatus shown in FIG. 1.

As shown in FIG. 8, in the full enclosed die forging apparatus thus constructed, the slug 13 inserted into the cavity 172 of the underside die 170 is formed under fully enclosed state produced by the upside die 150 and the underside die 170 abutting against each other, and taken out by the action of the knockout pin, etc.

And, in the full enclosed die forging apparatus thus constructed, the lower face of the pin 186 and the upper face of the push pin 185 abut against each other when the upside die 150 and the underside die 170 come into contact with each other.

Thereafter, when slide 143 descends further and push pin 185 also descends, vertical cam 183 descends as shown in FIG. 4 and in the right side of FIG. 5. With this, horizontal cam 180 is pressed toward the cam face 179 of pad 166, the pad 166 moves downward, and at the same time, underside die 170 also moves downward.

Here, when it is assumed that cam angles of vertical cam 183 and horizontal cam 180 are $\alpha$ and $\beta$, respectively, the descending speed ratio of the pad 166 to the vertical cam 183 is given as follows:

$$\tan \alpha \times \tan \beta$$

Accordingly, after vertical cam 183 comes in contact with horizontal cam 180, the underside die 170 descends at a speed lower than that of the upside punch 151 and the underside punch 171 move relatively to the upside die 150 and the underside die 170.

That is, despite that the upside die 150 and the underside die 170 descend at a speed lower than the descending speed of the upside punch 151, the underside punch 171 moves relatively to the upside die 150 and the underside die 170.

That is, despite that the upside die 150 and the underside die 170 descend at a speed lower than the descending speed of the upside punch 151, the underside punch 171 does not move. Therefore, when the slide 143 is made to descend, the upside punch 151 and the underside punch 171 rush into the upside die 150 and the underside die 170 respectively, so as to move closely, thereby to perform expected forging.

When for example, after upside die 150 and underside die 170 have contacted with each other, these are made to descend at a half of the descending speed of slide 143, viz. when a molded article is of face symmetrically related to the cross-section of the maximum area, both of angles of vertical cam 183 and horizontal cam 180, $\alpha$ and $\beta$, may be selected at 35 degrees 15 minutes 52 seconds theoretically.

Here, when it is assumed that the generating force of the upside cylinder 147 is at $P_u$, the generating force of the underside cylinder 161 is at $P_L$, the generating force of the auxiliary cylinder 174 is at $P_S$, and the force of the horizontal cam 180 to push down the underside pad 166 is at $P_c$, the force $F_u$ applied to the upside die is:

$$F_u = P_u$$

and the force $F_L$ applied to the underside die is:

$$F_L = P_L + P_S - P_C$$

When the forged article has a symmetric form with reference to the cross-section of the maximum area, $F_U = F_L$ is obtained. Namely, $P_C = (P_L - P_U) + P_S$ is obtained.

Here, $P_C > O$ is required in order that respective cam faces are maintained by contact with each other. Such a condition is satisfied by $P_L > P_U$ even if there were no auxiliary cylinder ($P_S = O$). However, for the purpose of stabilizing the cam operation, viz., in order to stabilize the relative speed of the upside punch 151 and the underside- punch 171 against the dies 150 and 170 during forging and to obtain a forged article of high accuracy, it is desired that the urging force of each cam face, viz., $P_C$ is constant.

However, $P_L$ and $P_U$ fluctuate because of viscosity variation of the pressure liquid, mixing of bubbles into the pressure liquid and so forth, thus, $$P_C = P_L - P_U \text{ (when } P_S = O\text{)}$$

is hardly constant.

In order to stabilize the urging force of the cam face, it is only required to make the cylinder diameters of the upside cylinder 147 and the underside cylinder 161 equal, and to supply pressure liquid from a common pressure liquid feeding device.

With such arrangement, even if viscosity variation of pressure liquid and mixing of bubbles into pressure liquid are generated, $P_L = P_U$, and in turn $P_C = P_S$, is always obtained. If a pressure liquid at an atmospheric pressure is supplied to the auxiliary cylinder, $P_S$, viz., $P_C$ becomes constant and the urging force applied to the cam face becomes stabilized, thus a forged article of high accuracy is obtainable.

Here, in the fully enclosed die forging apparatus thus constructed, cam mechanism 176 is constructed so as to be operated by the lower end of the push pin 185 which is moved downward synchronously with the movement of the slide 143, and at the same time, the upper end of the push pin 185 is made to abut directly against the piston of the cylinder 187 moving synchronously with the movement of the slide 143, viz., the lower end of the pin 186 having the piston portion 186a at the upper part thereof. Accordingly, when a great force is applied to the cam mechanism 176 by the movement of the slide 143, the pin 186 moves upward against the pressure of the pressure liquid in the cylinder 187, and no great force is applied to the cam mechanism 176.

Accordingly, it is possible to surely prevent a great force from being applied to the cam mechanism 176, and thus, to prevent the damage on the cam mechanism 176, etc.

Further, in the fully enclosed die forging apparatus thus constructed, the cam mechanism 176 which moves upside die 150 and underside die 170 under fully enclosed is composed of a support member consisting of the underside pad 166 which is installed between the underside die 170 and the underside cylinder 161 mechanism for supporting the underside die 170 directly and urged upward directly by means of the underside cylinder 161 mechanism, the push pin 185 moved downward synchronously with the movement of the slide 143, and the cam mechanism 176 which moves the underside pad 166 downward at a speed slower than the moving speed of the slide 143 by the movement of this push pin 185.

Accordingly, it is no longer required to dispose respective cams on the outer circumference of the underside die and to descend the underside die directly with these cams as in a conventional case. With this, the degree of freedom for this arrangement of the cam mechanism is increased, and it becomes possible to construct the cam mechanism 176 with linear cams as shown in FIG. 2 thru FIG. 5. Thus, the cam mechanism is simplified by a large margin as compared with a conventional press.

Figure 11:
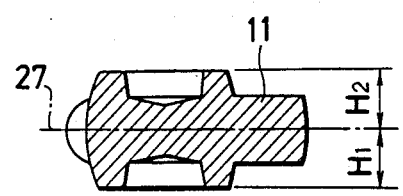
FIG. 11 is a longitudinal cross-sectional view of FIG. 10.
Figure 12:
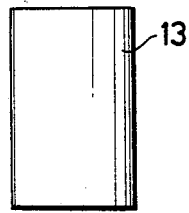
FIG. 12 is a side view showing a slug.
Figure 13:
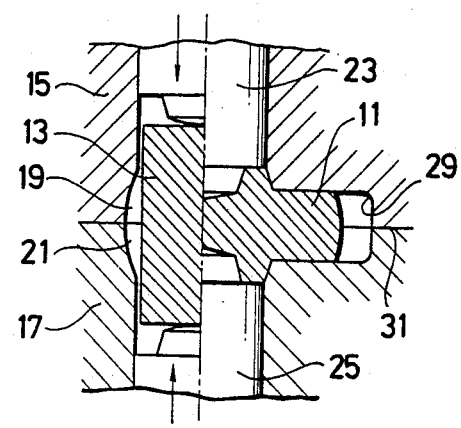
FIG. 13 is a longitudinal cross-sectional view showing a conventional full enclosed die forging method.
Figure 14:
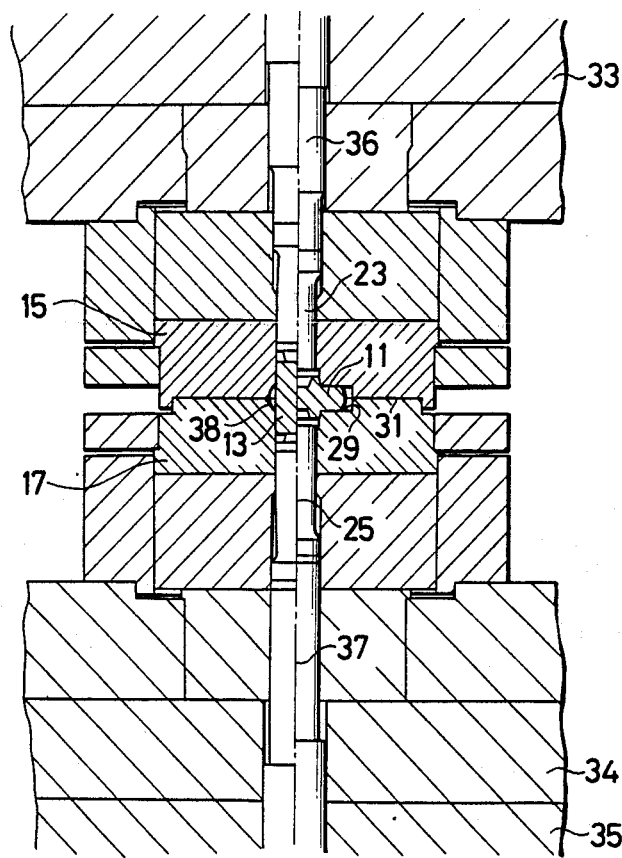
FIG. 14 and FIG. 15 are longitudinal cross-sectional views showing conventional full enclosed die forging apparatus, respectively.
Figure 15:
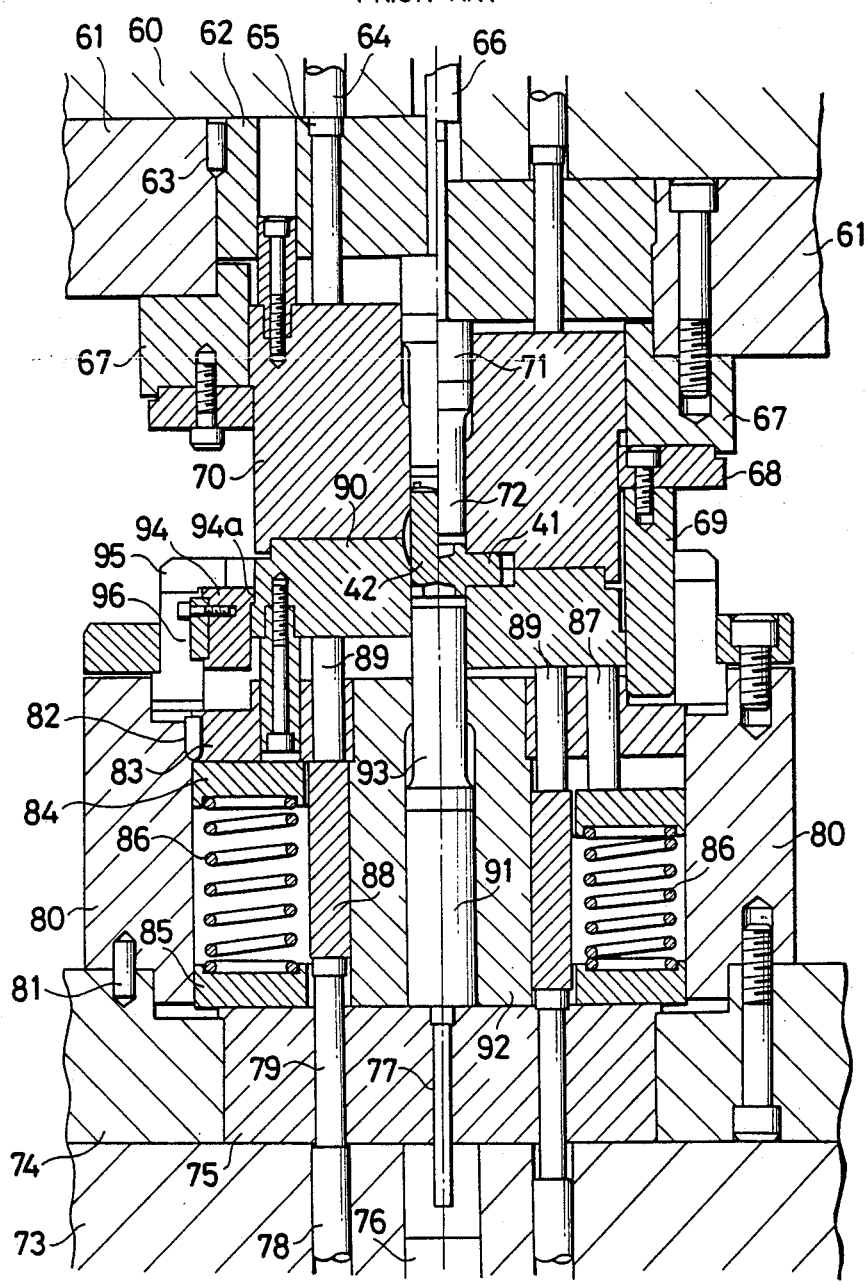
Figure 16:
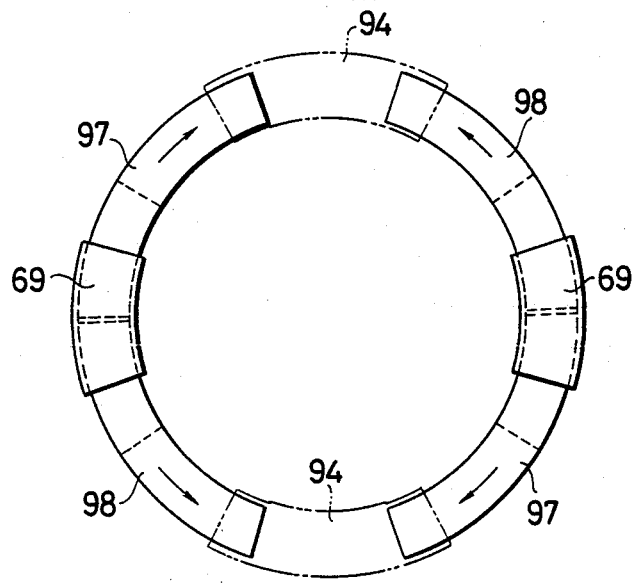
FIG. 16 thru FIG. 18 are explanatory views showing the cam mechanism shown in FIG. 15.
Figure 17:
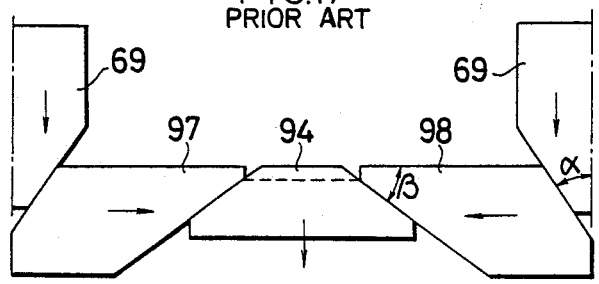
Figure 18:
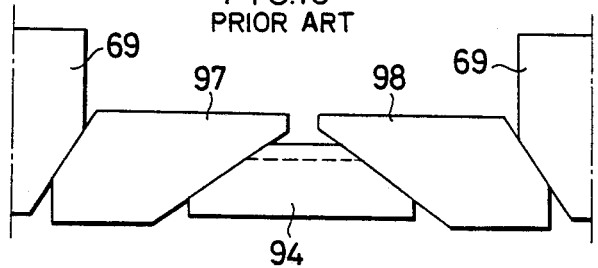

Furthermore, in the fully enclosed die forging apparatus thus constructed, the upper face of the cylinder 187 abuts against the lower surface of a nut 191 which is a position control mechanism, thereby to position the vertical position of the cylinder 187. Therefore, it is possible to perform fine adjustment of positions of plurality of cylinders 187 at the same time by loosening the ferrule 188 and adjusting the position of the nut 191, and it is also possible to adjust positions, $H_1$ and $H_2$ dimensions (FIG. 11), of the extruding portion of the molded article easily.

This is effectual for the adjustment in case of correction of dimensional variation of the molded article in mass production and replacement of a metal mold with a new metal mold.

Figure 9:
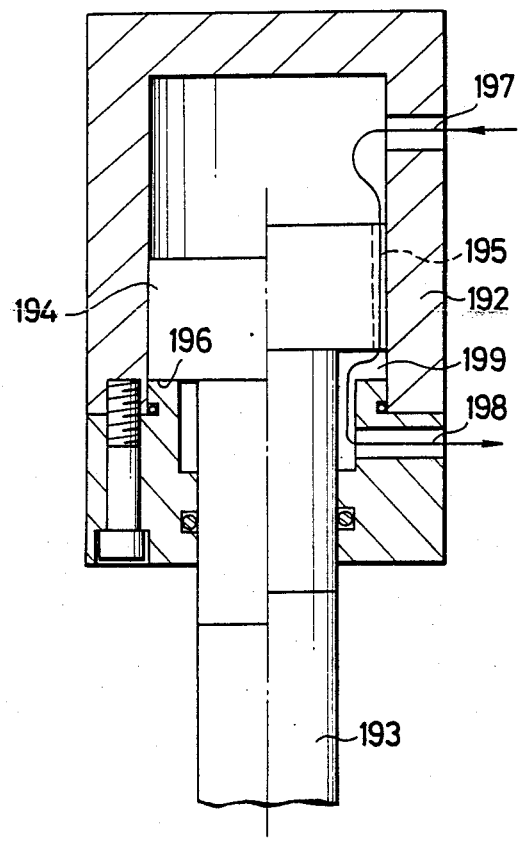
FIG. 9 is a longitudinal cross-sectional view showing a cylinder of another embodiment of the full enclosed die forging apparatus according to the present invention.
Figure 10:
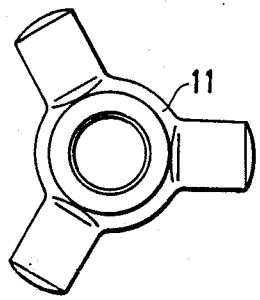
FIG. 10 is a top view showing an example of an article manufactured by a fully enclosed die forging.

FIG. 9 shows a cylinder in another embodiment of a full enclosed die forging apparatus according to the present invention. In this embodiment, a piston 194 is contained in a cylinder 192 for pressing a push pin 193 downward, and an oil groove 195 is formed on the side surface of this piston 194 and a seal portion 196 is formed on the lower surface thereof. Further, a liquid feeding hole 197 is provided in the upper part of the cylinder 192, and a drain hole 198 is provided at the lower part of the cylinder 192.

In such a cylinder 192, push pin 193 moves upward when a great force is applied to it. With this, as shown in the right side of FIG. 9, piston 194 moves upward and a clearance 199 is formed between the seal portion 196 of piston 194 and cylinder 192. As shown with an arrow mark in the pressure liquid in the cylinder 192 passes through the oil groove 195 of piston 194 and the clearance 199, and flows out of cylinder 192 through the drain hole 198 thereafter. As the result, the pressure in cylinder 192 drops sharply, which makes it possible for piston 194 to move further upward, thereby to remove the force acting on push pin 193 quickly.

Besides, in the above-mentioned embodiment, this is an example where the upper surface of underside pad 166 is made to abut against the lower surface of underside die 170, and the cam mechanism 176 is disposed on underside pat 166. However, the present invention is not limited to such an embodiment, but it is needless to say for instance that a cam mechanism may be formed on the piston of the underside cylinder and so forth.

As described above, according to the fully enclosed die forging apparatus of this invention, the cam mechanism is constucted so as to be operated by the lower end of the push pin moved downward synchronously with the movement of the slide, and the upper end of the push pin is also made to abut against the piston of the cylinder moving synchronously with the movement of the slide directly or indirectly. Accordingly, it is possible to surely prevent a great force being applied to the cam mechanism.

Also, according to the fully enclosed die forging apparatus of this invention, a position control mechanism is provided for adjusting positions of a plurality of cylinders. Therefore, the position of the extruding portion of the molded article may be adjusted simply.

What is claimed is:

1. A fully enclosed die forging apparatus comprising a slide having an upside die set plate, a bolster having an underside die set plate, an upside die and an underside die disposed oppositely in a vertical direction between said slide and said bolster, an upside cylinder mechanism disposed on said upside die set plate which urges said upside die downward, an underside cylinder mechanism disposed on said underside die set plate which urges said underside die upward, a support member for supporting the underside die, an upside punch inserted in said upside die that moves synchronously with the movement of said slide, an underside punch inserted in said underside die and supported by said bolster and a cam mechanism, said cam mechanism comprising at least one horizontal cam and at least one vertical cam in contact with said horizontal cam, said support member and horizontal cam being interengaged, at least one push pin having an upper end and a lower end, a push pin cylinder having a piston which abuts the upper end of said push pin for movement thereof synchronously with movement of the slide, the lower end of the push pin contacting the vertical cam for corresponding movement thereof, to cause descending movement of the support in response to movement of the horizontal cam produced by the vertical cam, whereby to cause both of said punches to accelerate into said dies by moving said upside die and said underside die downwardly at a slower speed than the moving speed of said slide.

2. A fully enclosed die forging apparatus as defined in claim 1 wherein adjusting means are provided for determining the position of said push pin cylinder.

3. The adjusting means as defined in claim 2 comprising a plurality of such push pins and corresponding push pin cylinders, each such push pin cylinder being vertically positionable relative to the press slide, wherein said adjusting means comprise a nut threadably engaged to said upside die holder, said nut contacting each of the push pin cylinders at the uppermost ends thereof for simultaneously determining the vertical positions of each of said cylinders.

4. A fully enclosed die forging apparatus as defined in claim 1 wherein a vertical cam is provided that abuts the lower end of said push pin.

5. A fully enclosed die forging apparatus as defined in claim 1 wherein said cam mechanism comprises a plurality of linear horizontal cams operated by the vertical cams, the horizontal cams interengaging said support members.

6. A fully enclosed die forging apparatus as defined in claim 1 wherein the cam mechanism includes a plurality of vertical cams engaging a corresponding plurality of linear horizontal cams having camming surfaces engaging a piston of said underside cylinder mechanism.

7. A fully enclosed die forging apparatus as defined in claim 6 wherein the cam mechanism includes multiple push pins.

8. A fully enclosed die forging apparatus comprising a slide having an upside die set plate, a bolster having an underside die set plate, an upside die and an underside die disposed oppositely in a vertical direction between said slide and said bolster, an upside cylinder mechanism disposed on said upside die set plate which urges said upside die downward, an underside cylinder mechanism disposed on said underside die set plate which urges said underside die upward, an upside punch inserted in said upside die that moves synchronously with the movement of said slide, an underside punch inserted in said underside die and supported by said bolster and a cam mechanism including at least one push pin and at least one push pin cylinder with a centrally disposed piston for push pin operation, said cam mechanism being operable in response to said push pin upon downward movement of said slide to cause descending movement of said underside die for causing said punches to accelerate into said dies, said piston having a groove formed on its side surface, a seal portion formed on its lower surface, a liquid feeding hole provided in the upper portion of said cylinder, a drain hole provided at the lower part of said cylinder, a push pin in abutting relationship to said piston for causing said push pin to move upwardly upon forced entrance of liquid through said liquid feeding hole into said cylinder so as to cause said piston to move upwardly forming a clearance with said cylinder at said seal portion allowing escape of such liquid from the cylinder thereby causing pressure in said cylinder to sharply decrease, permitting said piston to move further upward, for thereby quickly removing force from said push pin.

9. The adjusting means as defined in claim 8 comprising a plurality of such push pins and corresponding push pin cylinders, each such push pin cylinder being vertically positionable relative to the press slide, wherein said adjusting means comprise a nut threadably engaged to said upside die holder, said nut contacting each of the push pin cylinders at the uppermost ends thereof for simultaneously determining the vertical positions of each of said cylinders.

* * * * *